(12) United States Patent
Fukuda et al.

(10) Patent No.: US 10,399,249 B2
(45) Date of Patent: Sep. 3, 2019

(54) WIRE SAW DEVICE AND WORKPIECE CUTTING METHOD (71) Applicant: SUMCO CORPORATION, Tokyo (JP)

(72) Inventors: Masaki Fukuda, Tokyo (JP); Kazutaka Mizokami, Tokyo (JP); Shinji Oota, Tokyo (JP)

(73) Assignee: SUMCO CORPORATION, Tokyo (JP)

( * ) Notice: Subject to any disclaimer, the term of this patent is extended or adjusted under 35 U.S.C. 154(b) by 129 days.

(21) Appl. No.: 15/738,389

(22) PCT Filed: May 11, 2016

(86) PCT No.: PCT/JP2016/002306
§ 371 (c)(1),
(2) Date: Dec. 20, 2017

(87) PCT Pub. No.: WO2016/208112
PCT Pub. Date: Dec. 29, 2016

(65) Prior Publication Data
US 2018/0178409 A1    Jun. 28, 2018

(30) Foreign Application Priority Data

Jun. 23, 2015 (JP) ................. 2015-125697

(51) Int. Cl.
B28D 5/04 (2006.01)
B28D 5/00 (2006.01)

(52) U.S. Cl.
CPC .......... *B28D 5/0076* (2013.01); *B28D 5/007* (2013.01); *B28D 5/0082* (2013.01); *B28D 5/045* (2013.01); *Y02P 70/179* (2015.11)

(58) Field of Classification Search
CPC . B28D 5/045; B28D 5/04; B28D 5/00; B28D 5/007; B28D 5/0082
(Continued)

(56) References Cited

U.S. PATENT DOCUMENTS

2013/0327308 A1* 12/2013 Jeon ................. B28D 5/007
125/21

FOREIGN PATENT DOCUMENTS

JP    2000-141220 A    5/2000
JP        4958463 B2    6/2012
(Continued)

OTHER PUBLICATIONS

Korean Office Action dated Feb. 21, 2019 in Korean Application No. 10-2017-7036553.
(Continued)

*Primary Examiner* — Robert A Rose
(74) *Attorney, Agent, or Firm* — Greenblum & Bernstein, P.L.C.

(57) ABSTRACT

The wire saw device includes at least one wire, which is provided tightly to be capable of travelling in a direction crossing a workpiece to be cut, a workpiece holder, which is configured to hold the workpiece and to move the workpiece relative to the wire, slurry suppliers, which are configured to supply slurry to cut the workpiece from an upstream side in a travelling direction of the wire, and slurry collectors, which are configured to collect the slurry scattered due to contact with the workpiece. The slurry collector is configured to be movable in conjunction with the workpiece in the state where the slurry collector is disposed adjacent to the workpiece and also configured to be retractable with respect to the workpiece to be prevented from contacting the wire.

14 Claims, 5 Drawing Sheets (58) Field of Classification Search
USPC ......... 125/16.02, 21; 451/296, 168, 446, 53, 451/455
See application file for complete search history.

(56) References Cited

FOREIGN PATENT DOCUMENTS

| | | |
|---|---|---|
| JP | 2013-86233 A | 5/2013 |
| JP | 2013-538131 A | 10/2013 |
| KR | 20120096617 A | 8/2012 |
| TW | 201336627 A | 9/2013 |
| WO | 2009/104222 A1 | 8/2009 |

OTHER PUBLICATIONS

Office Action issued in Taiwan Counterpart Patent Appl. No. 105112386, dated Feb. 15, 2017, along with an English translation thereof.
Official Communication issued in International Bureau of WIPO Patent Application No. PCT/JP2016/002306, dated May 11, 2016.
International Preliminary Report on Patentability dated Dec. 26, 2017, along with an English translation thereof.

* cited by examiner

WIRE SAW DEVICE AND WORKPIECE CUTTING METHOD

TECHNICAL FIELD

The present disclosure relates to a wire saw device and a workpiece cutting method, especially to such wire saw device and workpiece cutting method that collect scattered slurry efficiently even in a mid-stage of a workpiece cutting process and improve surface quality of the sliced workpiece.

BACKGROUND

Wafers used as substrates of semiconductor devices are produced by slicing ingots of silicon, compound semiconductor, or the like and conducting a surface grinding (lapping) process, an etching process, and mirror-polishing (polishing) process, followed by final cleansing. Herein, such objects, including the ingots, to be cut by the wire saw device are called "workpieces."

Generally, a wire saw device used to slice a workpiece into wafers includes at least one wire provided tightly to be capable of travelling in a direction crossing the workpiece to be cut, a workpiece holder configured to hold the workpiece and to move the workpiece relative to the wire, and slurry suppliers configured to supply slurry to cut the workpiece from the upstream side in a travelling direction of the wire. In the wire saw device, the workpiece may be sliced into wafers by pressing the workpiece held by the workpiece holder against the fast-travelling wire while slurry is supplied from the slurry supplier to the wire.

In an early stage of the workpiece cutting process, a portion of slurry supplied from the slurry supplier to the wire is entrained into a cut of the workpiece to contribute to the cutting, while the remaining portion of slurry is dropped below the wire without contributing to the cutting. From the mid-stage and onward of the workpiece cutting process, the portion of slurry that used to be dropped without contributing to the cutting in the early stage starts to be scattered upward along an inclination of the workpiece and splash on a workpiece surface and the workpiece holder since the workpiece has a cylindrical shape.

The slurry splashing on the workpiece and the workpiece holder poses a problem that the excessively cooled workpiece and workpiece holder shrink, resulting in deterioration in cutting surface waviness index, such as nanotopography and Warp, of the sliced workpiece. An increase in cutting surface waviness component is difficult to correct perfectly in the subsequent lapping or polishing process and accordingly, significantly affects the shape and quality of the wafers as final products.

Figure 1:
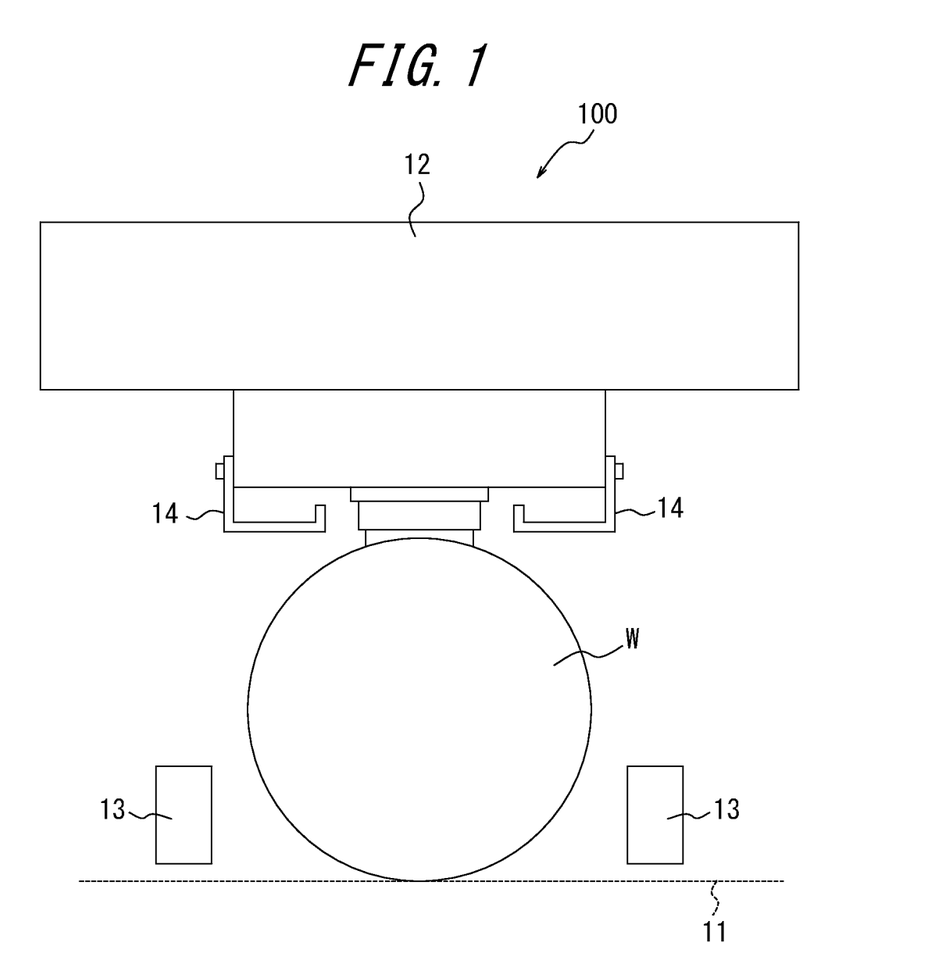
FIG. 1 illustrates a conventional wire saw device.

As a technology to solve the above problem, Patent Literature 1 proposes a wire saw device including slurry collectors configured to collect the slurry scattered upward due to contact with the workpiece. FIG. 1 illustrates the wire saw device proposed in Patent Literature 1. In the illustrated wire saw device 100, reference numeral 11 denotes the wire, reference numeral 12 denotes the workpiece holder, reference numeral 13 denotes the slurry supplier, and reference numeral W denotes the workpiece. The slurry collectors 14 are provided in a portion of the workpiece holder 12 that are located far away from the wire 11 and above the workpiece W to avoid contact between the slurry collector 14 and the wire 11 etc.

CITATION LIST

Patent Literature

PTL1: Japanese Patent No. 4958463

SUMMARY

Technical Problem

Figure 2A:
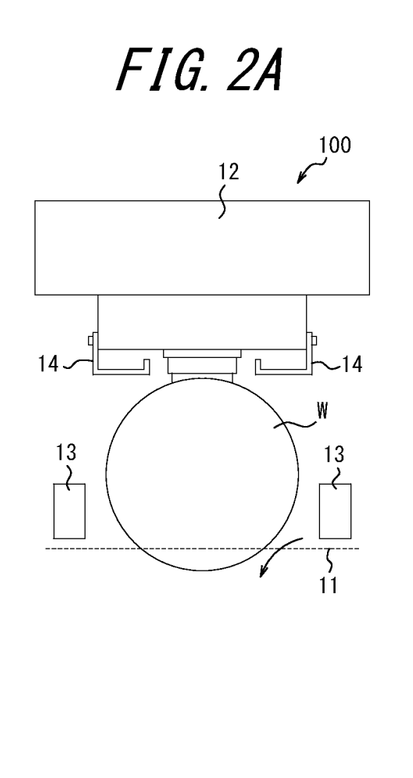
FIGS. 2A to 2C illustrate a workpiece cutting process using a wire saw device of FIG. 1.
Figure 2B:
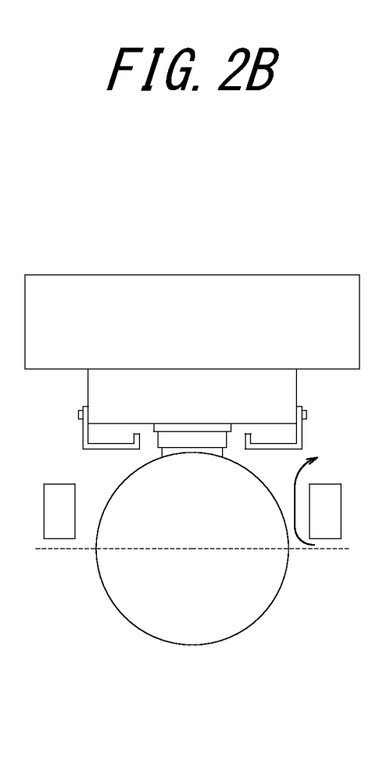
Figure 2C:
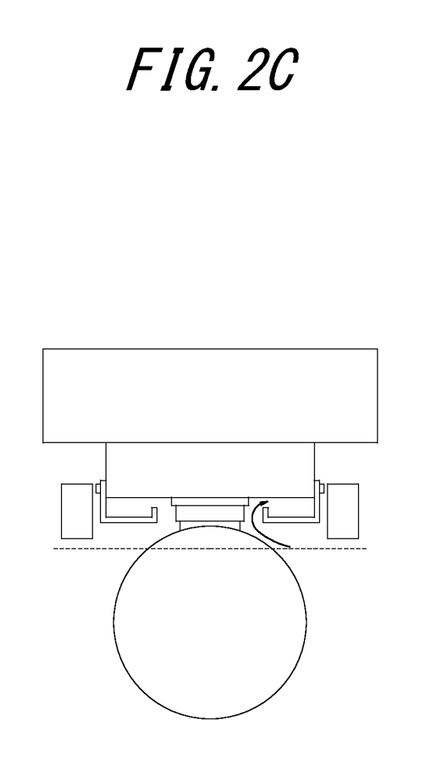

FIGS. 2A to 2C illustrate the workpiece W cutting process using the wire saw device 100 of FIG. 1, and FIG. 2A illustrates the early stage, FIG. 2B illustrates the mid-stage, and FIG. 2C illustrates the final stage. Arrows in the figures represent flow of a portion of slurry that does not contribute to cutting. The wire 11 is reciprocated, and FIGS. 2A to 2C illustrate the state where the wire 11 travels from the right to left in the drawings, with slurry being supplied from the slurry supplier 13, which is disposed on the right side of the workpiece W, to the wire 11. As illustrated in FIG. 2A, in the early stage of the workpiece cutting process, a portion of slurry that does not contribute to cutting is dropped below the device. On the other hand, as illustrated in FIG. 2B, from the mid-stage and onward of the workpiece cutting process, a portion of slurry that does not contribute to cutting is scattered upward along the inclination of the workpiece.

However, since as described earlier the wire saw device 100 includes the slurry collectors 14, which are disposed far away from the wire 11 and above the workpiece W, the scattered slurry may be collected in the final stage of the workpiece cutting process as illustrated in FIG. 2C. Nevertheless, in the mid-stage of the workpiece cutting process, the scattered slurry cannot be collected sufficiently. As a result, there is a problem that the shape and quality of the sliced workpiece W are still deteriorated.

In view of the above, the present disclosure is to provide a wire saw device and a workpiece cutting method that collect the scattered slurry efficiently even in the mid-stage of workpiece cutting process and improve the shape and quality of the sliced workpiece.

Solution to Problem

The present inventors have conducted earnest studies about how to solve the above problem. As described earlier, since in the wire saw device 100 described in Patent Literature 1 the slurry collectors are provided in a position fairly higher than an upper end of the workpiece W, the scattered slurry cannot be collected in the mid-stage of the workpiece cutting process, and the shape and quality of the sliced workpiece W are deteriorated.

The present inventors have conducted earnest studies about how to efficiently collect such slurry that is scattered after the mid-stage and onward of the workpiece cutting process and found that it is very effective to configure the slurry collectors to be movable in conjunction with the workpiece W in the state where the slurry collectors are disposed adjacent to the workpiece W.

However, moving the slurry collectors in conjunction with the workpiece W in the state where the slurry collector are disposed adjacent to the workpiece W poses a new problem that the slurry collectors may contact the wire 11 in the final stage of the workpiece cutting process. The present inventors have therefore conducted earnest studies about how to prevent the slurry collectors from contacting the wire 11 in the final stage of the workpiece cutting process and arrived at the idea of configuring the slurry collectors to be retractable with respect to the workpiece W to be prevented from contacting the wire 11. Thus, the present inventors have completed the present disclosure.

In detail, a summary of the present disclosure is as follows.

(1) A wire saw device including at least one wire provided tightly to be capable of travelling in a direction crossing a workpiece to be cut, a workpiece holder configured to hold the workpiece and to move the workpiece relative to the wire, slurry suppliers configured to supply slurry to cut the workpiece from an upstream side in a travelling direction of the wire, and slurry collectors configured to collect the slurry scattered due to contact with the workpiece, wherein the slurry collector is configured to be movable in conjunction with the workpiece in a state where the slurry collector is disposed adjacent to the workpiece and also configured to be retractable with respect to the workpiece to be prevented from contacting the wire.

(2) The wire saw device of (1) on the above, wherein a minimum gap between an innermost and lowermost end of the slurry collector and a surface of the workpiece is at least 10 mm and not more than 50 mm.

(3) The wire saw device of (1) or (2) on the above, wherein a minimum value of a vertical distance between the slurry collector and the wire is at least 5 mm and not more than 60 mm.

(4) The wire saw device of any one of (1) to (3) on the above, wherein the slurry collector is attached to the work holder in a manner such that the slurry collector is slidable in vertical direction.

(5) The wire saw device of any one of (1) to (4) on the above, wherein the slurry collector includes a receptacle configured to receive the scattered slurry and a supporter configured to support the receptacle, and the supporter is attached to the workpiece holder in a manner such that the supporter is slidable in vertical direction.

(6) The wire saw device of (5) on the above, wherein an innermost and lowermost end of the slurry collector is disposed between a vertical upper end of the workpiece and a center of the workpiece as viewed in vertical direction and is disposed between a horizontal end of the workpiece and the center of the workpiece as viewed in horizontal direction.

(7) The wire saw device of (5) or (6) on the above, wherein the receptacle extends horizontally or obliquely upward toward an inner side of the workpiece in radial direction.

(8) The wire saw device of (7) on the above, wherein an oblique angle of the receptacle with respect to horizontal direction is at least 0 degree and not more than 70 degrees.

(9) The wire saw device of any one of (1) to (8) on the above, further including a movement controller that is disposed between the slurry collector and the wire and that is configured to prevent the slurry collector from contacting the wire.

(10) The wire saw device of (9) on the above, wherein the movement controller is attached to the slurry supplier.

(11) A workpiece cutting method including supplying slurry to at least one wire while causing the wire to travel in a direction crossing a workpiece to be cut, and moving a workpiece holder configured to hold the workpiece relative to the wire and pressing the workpiece against the wire for infeed to thereby cut the workpiece into wafers, wherein the workpiece is moved relative to the wire while a slurry collectors are moved in conjunction with the workpiece in a state where the slurry collectors are disposed adjacent to the workpiece, the slurry collector being configured to collect the slurry scattered due to contact with the workpiece, and when a vertical distance between the slurry collector and the wire reaches a predetermined value, the slurry collectors are retracted with respect to the workpiece.

(12) A workpiece cutting method of (11) on the above, wherein the workpiece is moved relative to the wire while a minimum gap between an innermost and lowermost end of the slurry collector and a surface of the workpiece is at least 10 mm and not more than 50 mm.

(13) A workpiece cutting method of (11) or (12) on the above, wherein the predetermined value is at least 5 mm and not more than 60 mm.

(14) A workpiece cutting method of any one of (11) to (13) on the above, wherein the slurry collector includes a receptacle configured to receive the scattered slurry and a supporter configured to support the receptacle, and the workpiece is moved relative to the wire while an innermost and lowermost end of the slurry collector is disposed between a vertical upper end of the workpiece and a center of the workpiece as viewed in vertical direction and is disposed between a horizontal end of the workpiece and the center of the workpiece as viewed in horizontal direction.

Advantageous Effect

The present disclosure collects the scattered slurry efficiently even in the mid-stage of workpiece cutting process and improves the surface quality of the sliced workpiece.

DETAILED DESCRIPTION (Wire Saw Device)

A preferred embodiment of the present invention will be described below with reference to the drawings. A wire saw device according to the present disclosure includes at least one wire provided tightly to be capable of travelling in a direction crossing a workpiece to be cut, a workpiece holder configured to hold the workpiece and to move the workpiece relative to the wire, slurry suppliers configured to supply slurry to cut the workpiece from an upstream side in a travelling direction of the wire, and slurry collectors configured to collect the slurry scattered due to contact with the workpiece. Herein, it is important that the slurry collector is configured to be movable in conjunction with the workpiece in the state where the slurry collector is disposed adjacent to the workpiece and also configured to be retractable with respect to the workpiece to be prevented from contacting the wire.

The present disclosure is characterized by the configuration of the slurry collectors included in the wire saw device, and other configurations than the slurry collectors are not limited to particular embodiments and may be the same as conventional ones. In the following, with reference to the preferred embodiment, the presently disclosed wire saw device is described in detail.

Figure 3A:
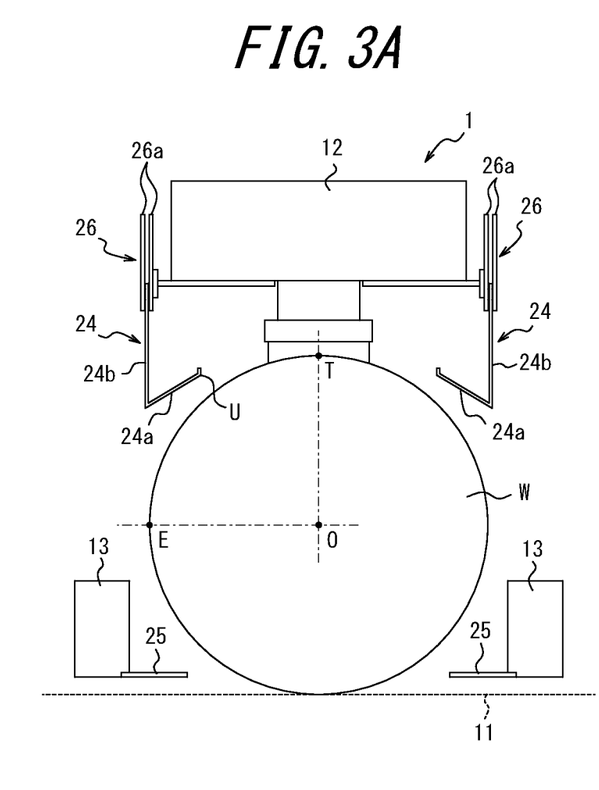
FIGS. 3A and 3B illustrate a wire saw device according to a preferred embodiment of the present disclosure.
Figure 3B:
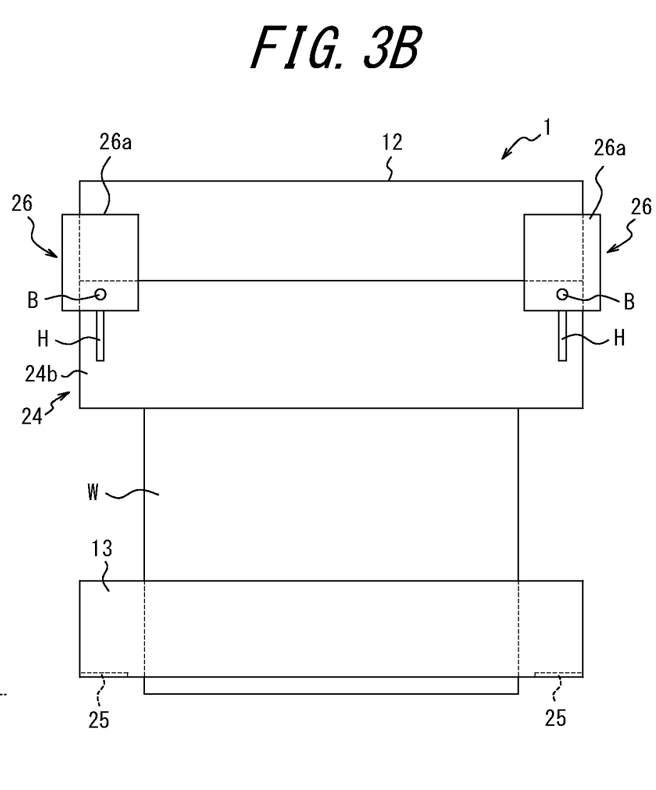

FIGS. 3A and 3B illustrate the wire saw device according to the preferred embodiment of the present disclosure, and FIG. 3A is a front view, and FIG. 3B is a side view. Note that in FIGS. 3A and 3B the same components are denoted by the same reference numerals as in FIG. 1. A wire saw device 1 of FIG. 3A includes at least one wire 11, which is provided tightly to be capable of travelling in a direction crossing a workpiece W to be cut, the workpiece holder 12, which is configured to hold the workpiece W and to move the workpiece W relative to the wire 11, slurry suppliers 13, which are configured to supply slurry to cut the workpiece W from an upstream side in a travelling direction of the wire 11, slurry collectors 24, which are configured to collect the slurry scattered due to contact with the workpiece W, and movement controllers 25, which are configured to prevent the slurry collectors 24 from contacting the wire 11.

The slurry collector 24 includes a receptacle 24a, which is configured to receive the scattered slurry, and a supporter 24b, which is configured to support the receptacle 24a. As illustrated in FIG. 3B, the supporter 24b is provided with a slotted hole H, which extends in the vertical direction. As illustrated in FIG. 3A, the workpiece holder 12 is provided, on each of side surfaces thereof, with a guide 26, in which two guide plates 26a are disposed to oppose each other with space therebetween. The supporter 24b of each slurry collector 24 is inserted between the corresponding two guide plates 26a, with a pin B, passing through the guide plates 26a, being inserted into the slotted hole H. Thus, the slurry collector 24 is attached to the guide 26, that is to say, to the workpiece holder 12, in a manner such that the slurry collector 24 is slidable in the vertical direction.

A slidable range of the slurry collector 24 is determined by the length of the slotted hole H, and the length of the slotted hole H may be determined as appropriate based on the position of the slurry collector 24 relative to the workpiece W and the position of the movement controller 25 so that the slurry collector 24 will not contact the wire 11. During non-operation and operation of the wire saw device 1, when the slurry collector 24 is out of contact with the movement controller 25, the slurry collector 24 is positioned at the lower limit of the slidable range due to its own weight.

By attaching the slurry collectors 24 to the workpiece holder 12 as described above, need for a mechanism used to move the slurry collectors 24 in conjunction with the workpiece is omitted. The result is that the device is compact and device cost is reduced.

The movement controller 25 serves to prevent the slurry controller 24 from contacting the wire 11 when the slurry collector 24 moves in conjunction with the workpiece W being moved relative to the wire 11 by the workpiece holder 12, and the movement controller 25 is disposed in a predetermined position above the wire 11. A plate-shaped member formed by an appropriate material may for example be used as the movement controller 25.

In the device 1 of FIGS. 3A and 3B, the movement controller 25 is attached to the slurry supplier 13. The above configuration omits need for a member or the like that supports the movement controller 25, and the result is that the device is compact and that device cost is reduced.

The slurry collectors 24 are disposed adjacent to the workpiece W. In the present disclosure, the "state where the slurry collectors are disposed adjacent to the workpiece" refers to the state where an innermost and lowermost end (which corresponds to an end U of the receptacle 24a in FIG. 3A) of the slurry collector 24 is disposed between a vertical upper end T of the workpiece W and a center O of the workpiece W as viewed in the vertical direction and is disposed between a horizontal end E of the workpiece W and the center O of the workpiece W as viewed in the horizontal direction.

The slurry collectors 24 are configured to be movable in conjunction with the workpiece W in the state where the slurry collector 24 is disposed adjacent to the workpiece W. In the present disclosure, "to be movable in conjunction with the workpiece" means to be movable while a positional relation relative to the workpiece W is maintained. For example, when the workpiece w is moved downward in its extension direction by the workpiece holder 12, the slurry collector 24 may be moved downward in the vertical direction in the state where the slurry collector 24 maintains the positional relation relative to the workpiece W. In the device 1 of FIGS. 3A and 3B, since being attached to the workpiece holder 12, the slurry collectors 24 are movable in conjunction with the workpiece W in the state where the slurry collector 24 is disposed adjacent to the workpiece W.

When the slurry collectors 24 are movable in conjunction with the workpiece W in the state where the slurry collector 24 is disposed adjacent to the workpiece W, the slurry contacting the workpiece W in the mid-stage of the workpiece cutting process passes through a gap defined between the slurry collector 24 and a surface of the workpiece W to be scattered upward and efficiently collected by the slurry collector 24. As a result, the slurry is prevented from splashing on the workpiece from the mid-stage and onward of the workpiece cutting process, and excessive cooling of the workpiece W is prevented. Furthermore, waviness of the sliced workpiece W is prevented, and the shape and quality of the workpiece W are improved.

However, since the slurry collectors 24 are disposed in a position lower than the upper end of the workpiece W, when the workpiece W is continued to be moved downward in the vertical direction by the workpiece holder 12 in the state where the slurry collector 24 are disposed adjacent to the workpiece W, the slurry collector 24, moving in conjunction with the workpiece W, inevitably contacts the wire 11 in the final stage of the workpiece cutting process. Accordingly, to prevent the slurry collectors 24 from contacting the wire 11, the slurry collectors 24 are configured to be retractable with respect to the workpiece W.

In the wire saw device 1 of FIGS. 3A and 3B, in a predetermined position above the wire 11 in the vertical direction, the movement controllers 25 are provided to prevent downward movement of the slurry collectors 24 in the vertical direction. Accordingly, when a lower end of the slurry collector 24, which is moved downward in the vertical direction in conjunction with the workpiece W, comes into contact with the movement controller 25 in the workpiece cutting process, the supporter 24b of the slurry collector 24 slides upward in the vertical direction inside the corresponding guide 26, which is provided in the workpiece holder 12, and thus, the slurry collectors 24 are retracted with respect to the workpiece W. In this way, the slurry collectors 24 are prevented from contacting the wire 11.

In the device 1 of FIGS. 3A and 3B, a minimum value of a distance between the innermost and lowermost end U of the slurry collector 24 and the surface of the workpiece W, i.e., a minimum gap between the innermost and lowermost end U of the slurry collector 24 and the surface of the workpiece W when the slurry collector 24 is positioned in the lower limit of the slidable range of the guide 26, is preferably at least 10 mm and not more than 50 mm. With the above configuration, as described in Examples below, nanotopography of the sliced workpiece is limited to the minimum range.

Furthermore, a minimum value of a vertical distance between the slurry collector 24 and the wire 11 (i.e., in the wire saw device 1, the height of the movement collector 25 measured from the wire 11) is preferably at least 5 mm although it may be any value that allows the slurry collector 24 to be prevented from contacting the wire 11. When the vertical distance is more than 60 mm, the slurry collectors 24 are moved away relative to the workpiece W in an early stage of the workpiece cutting process, thereby reducing the effect of improving efficiency in collecting the slurry scattered upward. For this reason, the vertical distance is preferably not more than 60 mm.

A lower surface (i.e., in the wire saw device 1, a lower surface of the receptacle 24a) of the slurry collector 24 may extend in parallel with the horizontal direction (i.e., an oblique angle of the receptacle 24a with respect to the horizontal direction may be 0 degree) to collect the slurry. However, as illustrated in FIG. 3A, the lower surface preferably extends obliquely upward toward the inner side of the workpiece W in the radial direction. With the above configuration, the slurry scattered upward along the surface of the workpiece W is guided to a gap between the workpiece W and the slurry collector 24 effectively, and the efficiency in collecting the slurry is improved.

In the above case, an oblique angle of the receptacle 24a with respect to the horizontal direction is preferably more than 0 degree and not more than 70 degrees. The above configuration increases the effect of collecting the slurry scattered upward to the maximum.

As in the device 1 illustrated in FIGS. 3A and 3B, the slurry collectors 24 are preferably attached to the workpiece holder 12 in a manner such that the slurry collector 24 is slidable in the vertical direction. The above configuration omits need for additionally preparing a device that moves the slurry holder 24 in conjunction with the workpiece W or a device that moves the slurry holder 24 relative to the workpiece W and reduces device cost.

Figure 4A:
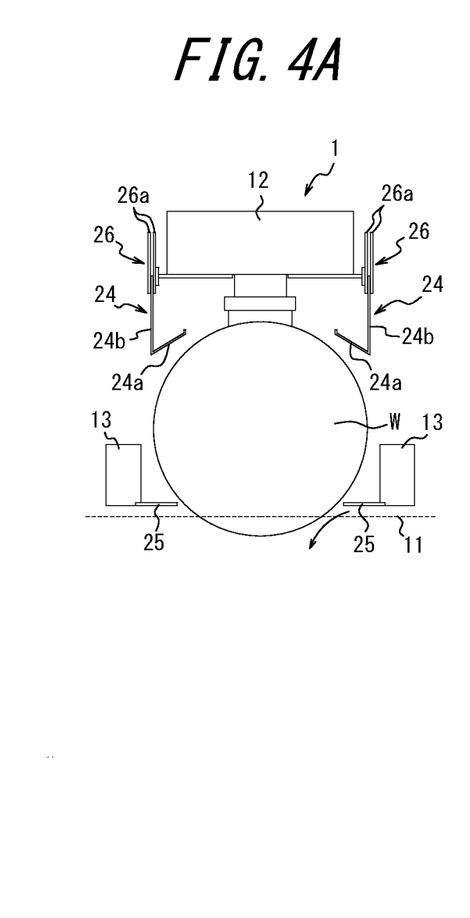
FIGS. 4A to 4C illustrate a workpiece cutting process using a wire saw device of FIGS. 3A and 3B.
Figure 4B:
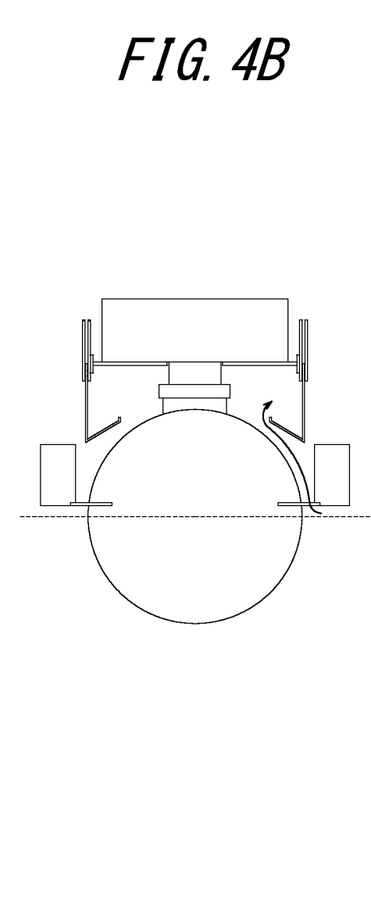
Figure 4C:
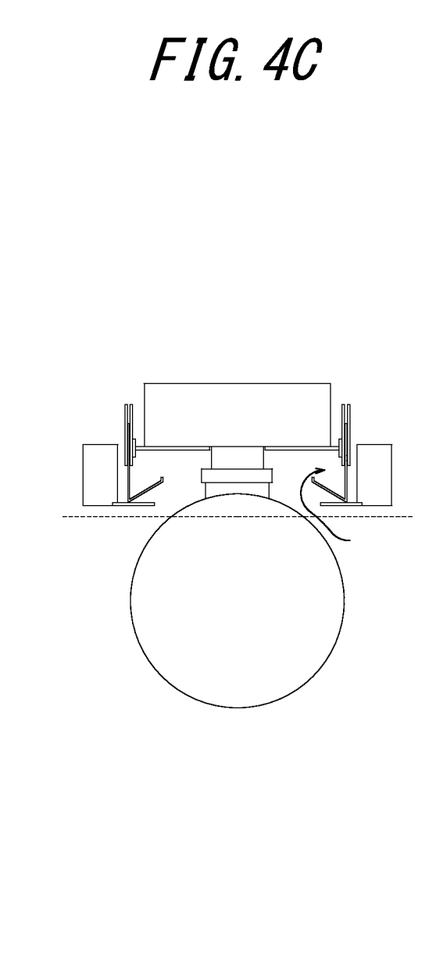

FIGS. 4A to 4C illustrate the workpiece W cutting process using the wire saw device 1 of FIGS. 3A and 3B, and FIG. 4A illustrates an early stage, FIG. 4B illustrates a mid-stage, and FIG. 4C illustrates a final stage. Arrows in the figures represent flow of a portion of slurry that does not contribute to cutting. FIGS. 4A to 4C illustrate the state where the wire 11 travels from the right to left in the drawings, with slurry being supplied from the slurry supplier 13, which is disposed on the right side of the workpiece W, to the wire 11. As illustrated in FIG. 4A, in the early stage of the workpiece cutting process, a portion of slurry that does not contribute to cutting is dropped below the device similarly to the device 100 of FIG. 1.

On the other hand, as illustrated in FIG. 4B, from the mid-stage and onward of the workpiece cutting process, a portion of slurry that does not contribute to cutting starts to be scattered upward along the inclination of the workpiece. However, it is to be noted that, since in the wire saw device 1 the slurry collectors 24 are moved in conjunction with the workpiece W in the state where the slurry collector 24 are disposed adjacent to the workpiece W, the slurry scattered upward from the mid-stage and onward of the workpiece cutting process is collected efficiently by the slurry collectors 24.

Subsequently, in the final stage of the workpiece cutting process when the lower end of the slurry collector 24 comes into contact with the movement controller 25, the supporter 24b of the slurry collector 24 slides upward in the vertical direction inside the corresponding guide 26, which is provided in the workpiece holder 12, and thus, the slurry collector 24 is retracted with respect to the workpiece W. Consequently, although the slurry collectors 24 are moved upward in the device, slurry reaches an upper portion of the device 1 in the final stage of the workpiece cutting process, and accordingly, as illustrated in FIG. 4C, the scattered slurry is collected by the slurry collectors 24 sufficiently.

Thus, the presently disclosed wire saw device efficiently collects the scattered slurry even in the mid-stage of the workpiece cutting process and improves the shape and quality of the sliced workpiece.

Additionally, the device 1 of FIGS. 3A and 3B is merely a preferred example of device, and a variety of changes may be made. For example, the slurry collectors 24 do not necessarily need to be attached to the workpiece holder 12 and may be provided in a separate support body in a manner such that the slurry collectors 24 are movable in the vertical direction.

(Workpiece Cutting Method)

Next, a description is given of a workpiece cutting method according to the present disclosure. The presently disclosed workpiece cutting method includes supplying slurry to at least one wire while causing the wire to travel in a direction crossing a workpiece to be cut, and moving a workpiece holder configured to hold the workpiece relative to the wire and pressing the workpiece against the wire for infeed to thereby cut the workpiece into wafers.

In the present disclosure, it is important that the workpiece W is moved relative to the wire 11 while the slurry collectors 24, which are configured to collect slurry scattered due to contact with the workpiece W, are moved in conjunction with the workpiece in the state where the slurry collector 24 are disposed adjacent to the workpiece W. Consequently, the slurry contacting the workpiece W in the mid-stage of a workpiece cutting process passes through a gap defined between the slurry collector 24 and a surface of the workpiece W to be scattered upward and efficiently collected by the slurry collectors 24. As a result, the slurry is prevented from splashing on the workpiece from the mid-stage and onward of the workpiece cutting process, and excessive cooling of the workpiece W is prevented. Furthermore, waviness of the sliced workpiece W is prevented, and the shape and quality of the workpiece W are improved.

Furthermore, when a vertical distance between the slurry collector and the wire reaches a predetermined value as the workpiece W is moved relative to the wire 11, the slurry collectors are retracted with respect to the workpiece. The above configuration prevents the slurry collectors 24 from contacting the wire 11.

Preferably, the workpiece W is moved relative to the wire 11 while a minimum gap between the innermost and lowermost end U of the slurry collector 24 and the surface of the workpiece W is at least 10 mm and not more than 50 mm. With the above configuration, as described above, nanotopography of the sliced workpiece 11 is limited to the minimum range.

Preferably, the predetermined value is at least 5 mm and not more than 60 mm. With the above configuration, as described above, the workpiece is cut without reducing the effect of improving efficiency in collecting the slurry scattered upward due to the slurry collector 24 being moved away relative to the workpiece W in an early stage of the workpiece cutting process.

Preferably, the slurry collector 24 includes a receptacle 24a, which is configured to receive the scattered slurry, and a supporter 24b, which is configured to support the receptacle 24a, and the workpiece W is moved relative to the wire 11 while the innermost and lowermost end U of the slurry collector 24 is disposed between the vertical upper end T of the workpiece W and the center O of the workpiece W as viewed in the vertical direction and is disposed between the horizontal end E of the workpiece W and the center O of the workpiece W as viewed in the horizontal direction. With the above configuration, slurry is collected efficiently from the mid-stage and onward of the workpiece cutting process.

EXAMPLES

Examples of the present disclosure are described hereinafter. However, the present disclosure is not limited to these Examples.

Example

By using the presently disclosed wire saw device 1 of FIGS. 3A and 3B, a silicon single crystal ingot (diameter 300 mm, block length 300 mm) as the workpiece W was cut into wafers each having a thickness of 0.8 mm to 0.9 mm. Herein, the slurry collector 24 of the wire saw device 1 included the receptacle 24a, which was formed by a member such as a metal plate or a resin plate, and the supporter 24b. The receptacle 24a had a horizontal width of 50 mm and a height of 25 mm and was 32° oblique with respect to the horizontal direction. The minimum gap between the receptacle 24a and the workpiece W was set to 22 mm.

The movement controller 25, formed by SUS, was attached to a position by which a vertical distance from the wire 11 of the slurry supplier 13 to the movement collector 25 was 5 mm. Other cutting conditions are indicated in Table 1 below.

TABLE 1

|  |  | Cutting conditions |
|---|---|---|
| Workpiece | Ingot diameter | 300 mm |
| Wire | Wire diameter | Approximately 0.11-0.18 mm |
|  | Wire tension | Approximately 20-30N |
|  | Wire running speed | Average speed 400-900 m/min |
| Slurry | Abrasive grain | Average grain diameter 5-15 μm |
|  | Slurry supply amount | 50-150 kg/min |
|  | Slurry temperature | 18.0-26.0° C. |

Comparative Example

By using the wire saw device 100 of FIG. 1, the same test as Example was conducted. In the device 100, the slurry collectors 14 were configured to achieve a distance of 75 mm between the slurry collector 14 and the workpiece at a lower end of a tip portion of the workpiece. Other cutting conditions than the above were the same as Example.
<Evaluation of Nanotopography>
Nanotopography is one of indices representing waviness component on a wafer surface and obtained as a peak-valley value, i.e., an index representing magnitude of minute irregularities in a spatial wavelength region of several ten millimeters. A larger value indicates larger waviness and a surface shape with sharper waviness. For wafers obtained in Example and Comparative Example, wafer surface nanotopography was evaluated by using Dynasearch manufactured by Raytex Corporation.

Figure 5:
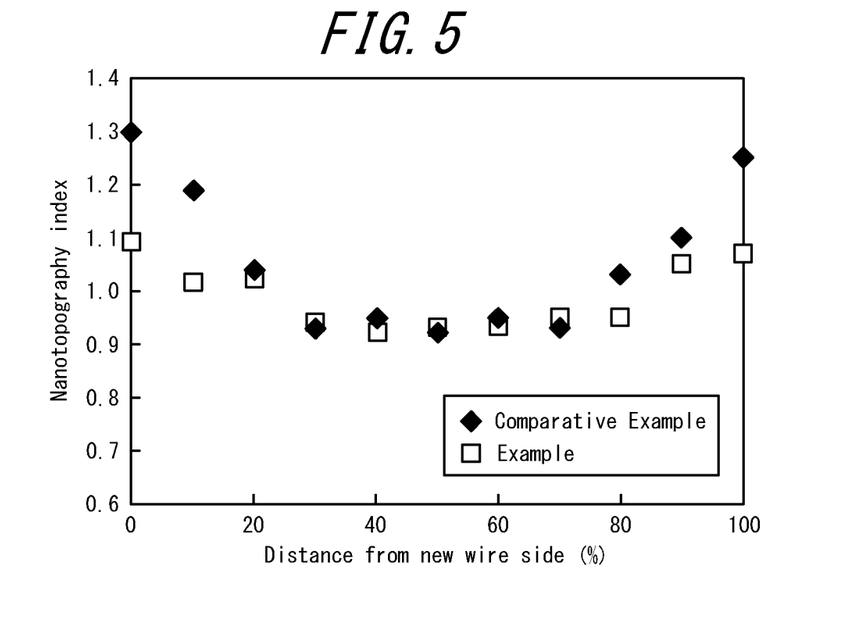
FIG. 5 illustrates wafer nanotopography index.

FIG. 5 illustrates wafer nanotopography index. In this figure, "nanotopography index" represents nanotopography value obtained in Comparative Example and Example, with an average nanotopography value of all the wafers obtained in Comparative Example being 1. The horizontal axis represents wafer nanotopography values plotted every 10% for different positions, with the new wire feed side of the workpiece being 0% and the other side of the workpiece being 100%. For each of Example and Comparative Example, 11 wafers were subjected to the evaluation. As is seen from FIG. 5, deterioration of nanotopography was prevented especially in both ends of the workpiece.

Figure 6:
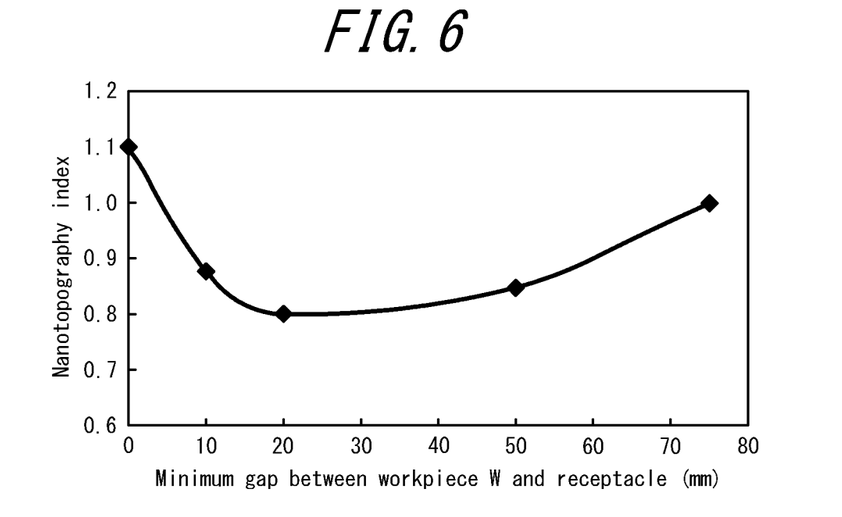
FIG. 6 illustrates a relation between a minimum gap between a workpiece and a receptacle of a slurry collector and wafer nanotopography.

FIG. 6 illustrates a relation between a minimum gap between the silicon single crystal ingot (workpiece W) and the receptacle 24a of the slurry collector 24 and wafer nanotopography when the device 1 of FIGS. 3A and 3B is used. The figure was obtained by adjusting the minimum gap between the receptacle and the workpiece in Example, with that of Comparative Example according to conventional technology being 75 mm. From the figure, it is seen that nanotopography value is minimum when the minimum gap between the innermost and lowermost end U of the slurry collector 24 and the surface of the silicon single crystal ingot is at least 10 mm and not more than 50 mm.

INDUSTRIAL APPLICABILITY

The present disclosure collects slurry scattered upward along a surface of a workpiece efficiently from a mid-stage of workpiece cutting process and improves the surface quality of the sliced workpiece and accordingly, is useful in the semiconductor industry.

REFERENCE SIGNS LIST 1, 100 wire saw device
11 wire
12 workpiece holder
13 slurry supplier
14, 24 slurry collector
24a receptacle
24b supporter
25 movement controller
26 guide
26a guide plate
W workpiece
B pin
H slotted hole

The invention claimed is:
1. A wire saw device comprising at least one wire provided tightly to be capable of travelling in a direction crossing a workpiece to be cut, a workpiece holder configured to hold the workpiece and to move the workpiece relative to the wire, slurry suppliers configured to supply slurry to cut the workpiece from an upstream side in a travelling direction of the wire, and slurry collectors configured to collect the slurry scattered due to contact with the workpiece, wherein
the slurry collector is configured to be movable in conjunction with the workpiece in a state where the slurry collector is disposed adjacent to the workpiece and also configured to be retractable with respect to the workpiece to be prevented from contacting the wire.
2. The wire saw device of claim 1, wherein a minimum gap between an innermost and lowermost end of the slurry collector and a surface of the workpiece is at least 10 mm and not more than 50 mm.

3. The wire saw device of claim 1, wherein a minimum value of a vertical distance between the slurry collector and the wire is at least 5 mm and not more than 60 mm.

4. The wire saw device of claim 1, wherein the slurry collector is attached to the work holder in a manner such that the slurry collector is slidable in vertical direction.

5. The wire saw device of claim 1, wherein the slurry collector includes a receptacle configured to receive the scattered slurry and a supporter configured to support the receptacle, and the supporter is attached to the workpiece holder in a manner such that the supporter is slidable in vertical direction.

6. The wire saw device of claim 5, wherein an innermost and lowermost end of the slurry collector is disposed between a vertical upper end of the workpiece and a center of the workpiece as viewed in vertical direction and is disposed between a horizontal end of the workpiece and the center of the workpiece as viewed in horizontal direction.

7. The wire saw device of claim 5, wherein the receptacle extends horizontally or obliquely upward toward an inner side of the workpiece in radial direction.

8. The wire saw device of claim 7, wherein an oblique angle of the receptacle with respect to horizontal direction is at least 0 degree and not more than 70 degrees.

9. The wire saw device of claim 1, further comprising a movement controller that is disposed between the slurry collector and the wire and that is configured to prevent the slurry collector from contacting the wire.

10. The wire saw device of claim 9, wherein the movement controller is attached to the slurry supplier.

11. A workpiece cutting method comprising supplying slurry to at least one wire while causing the wire to travel in a direction crossing a workpiece to be cut, and moving a workpiece holder configured to hold the workpiece relative to the wire and pressing the workpiece against the wire for infeed to thereby cut the workpiece into wafers, wherein the workpiece is moved relative to the wire while slurry collectors are moved in conjunction with the workpiece in a state where the slurry collectors are disposed adjacent to the workpiece, the slurry collector being configured to collect the slurry scattered due to contact with the workpiece, and when a vertical distance between the slurry collector and the wire reaches a predetermined value, the slurry collectors are retracted with respect to the workpiece.

12. A workpiece cutting method of claim 11, wherein the workpiece is moved relative to the wire while a minimum gap between an innermost and lowermost end of the slurry collector and a surface of the workpiece is at least 10 mm and not more than 50 mm.

13. A workpiece cutting method of claim 11, wherein the predetermined value is at least 5 mm and not more than 60 mm.

14. A workpiece cutting method of claim 11, wherein the slurry collector includes a receptacle configured to receive the scattered slurry and a supporter configured to support the receptacle, and the workpiece is moved relative to the wire while an innermost and lowermost end of the slurry collector is disposed between a vertical upper end of the workpiece and a center of the workpiece as viewed in vertical direction and is disposed between a horizontal end of the workpiece and the center of the workpiece as viewed in horizontal direction.

* * * * *